(12) United States Patent
Prins et al.

(10) Patent No.: US 9,753,649 B2
(45) Date of Patent: Sep. 5, 2017

(54) TRACKING INTERMIX OF WRITES AND UN-MAP COMMANDS ACROSS POWER CYCLES

(71) Applicant: SanDisk Technologies LLC, Plano, TX (US)

(72) Inventors: Douglas A. Prins, Laguna Hills, CA (US); Aaron K. Olbrich, Morgan Hill, CA (US); Huapeng Guan, Fremont, CA (US); Graeme Weston-Lewis, Pleasanton, CA (US); Anand Kulkarni, San Jose, CA (US); Yipei Yu, San Francisco, CA (US)

(73) Assignee: SanDisk Technologies LLC, Plano, TX (US)

( * ) Notice: Subject to any disclaimer, the term of this patent is extended or adjusted under 35 U.S.C. 154(b) by 76 days.

(21) Appl. No.: 14/659,493

(22) Filed: Mar. 16, 2015

(65) Prior Publication Data

US 2016/0117099 A1 Apr. 28, 2016

Related U.S. Application Data

(60) Provisional application No. 62/069,249, filed on Oct. 27, 2014, provisional application No. 62/069,251, filed on Oct. 27, 2014.

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/0659* (2013.01); *G06F 3/0688* (2013.01);
(Continued)

(58) Field of Classification Search
USPC ......................................................... 711/103
See application file for complete search history.

(56) References Cited

U.S. PATENT DOCUMENTS

| 4,586,167 A | 4/1986 | Fujishima et al. |
| 5,559,988 A | 9/1996 | Durante et al. |

(Continued)

FOREIGN PATENT DOCUMENTS

| EP | 0 376 285 A2 | 7/1990 |
| WO | WO 2012/083308 | 6/2012 |

OTHER PUBLICATIONS

International Search Report and Written Opinion dated Nov. 18, 2015, received in International Patent Application No. PCT/US2015/039552 which corresponds to U.S. Appl. No. 14/559,183, 11 pages (Ellis).

(Continued)

*Primary Examiner* — Mardochee Chery
(74) *Attorney, Agent, or Firm* — Brinks Gilson & Lione

(57) ABSTRACT

Systems, methods and/or devices are used to enable tracking intermix of writes and un-map commands across power cycles. In one aspect, the method includes (1) receiving, at a storage device, a plurality of commands from a host, the storage device including non-volatile memory, (2) maintaining a log corresponding to write commands and un-map commands from the host, (3) maintaining a mapping table in volatile memory, the mapping table used to translate logical addresses to physical addresses, (4) saving the mapping table, on a scheduled basis that is independent of the un-map commands, to the non-volatile memory of the storage device, (5) saving the log to the non-volatile memory, and (6) upon power up of the storage device, rebuilding the mapping table from the saved mapping table in the non- (Continued)

volatile memory of the storage device and from the saved log in the non-volatile memory of the storage device.

23 Claims, 6 Drawing Sheets

(51) Int. Cl.
    *G06F 12/02*           (2006.01)
    *G06F 11/14*           (2006.01)

(52) U.S. Cl.
    CPC ...... *G06F 11/1441* (2013.01); *G06F 12/0246* (2013.01); *G06F 11/1471* (2013.01); *G06F 2212/7201* (2013.01); *G06F 2212/7205* (2013.01); *G06F 2212/7207* (2013.01); *G06F 2212/7208* (2013.01)

(56) References Cited

U.S. PATENT DOCUMENTS

| | | | |
|---|---|---|---|
| 5,909,559 | A | 6/1999 | So |
| 6,247,136 | B1 | 6/2001 | MacWilliams et al. |
| 6,292,410 | B1 | 9/2001 | Yi et al. |
| 6,401,213 | B1 | 6/2002 | Jeddeloh |
| 6,449,709 | B1 | 9/2002 | Gates |
| 7,969,809 | B2 | 6/2011 | Ben-Rubi |
| 8,010,738 | B1 | 8/2011 | Chilton et al. |
| 8,122,202 | B2 | 2/2012 | Gillingham |
| 8,213,255 | B2 | 7/2012 | Hemink et al. |
| 8,255,618 | B1 | 8/2012 | Borchers et al. |
| 8,321,627 | B1 | 11/2012 | Norrie et al. |
| 8,429,498 | B1 | 4/2013 | Anholt et al. |
| 8,479,080 | B1 | 7/2013 | Shalvi et al. |
| 8,539,139 | B1 | 9/2013 | Morris |
| 8,595,590 | B1 | 11/2013 | Vojcic et al. |
| 8,775,720 | B1 | 7/2014 | Meyer et al. |
| 8,825,967 | B2 | 9/2014 | Hong Beom |
| 8,874,836 | B1 | 10/2014 | Hayes et al. |
| 8,886,872 | B1 | 11/2014 | Norrie |
| 8,924,661 | B1 | 12/2014 | Shachar et al. |
| 8,984,376 | B1 | 3/2015 | Norrie |
| 9,128,825 | B1 | 9/2015 | Albrecht et al. |
| 9,170,876 | B1 | 10/2015 | Bates et al. |
| 9,176,971 | B2 | 11/2015 | Shapiro |
| 9,214,965 | B2 | 12/2015 | Fitzpatrick et al. |
| 2003/0115403 | A1 | 6/2003 | Bouchard et al. |
| 2003/0122834 | A1 | 7/2003 | Mastronarde et al. |
| 2004/0117441 | A1 | 6/2004 | Liu et al. |
| 2005/0144361 | A1 | 6/2005 | Gonzalez et al. |
| 2005/0248992 | A1 | 11/2005 | Hwang et al. |
| 2007/0002629 | A1 | 1/2007 | Lee et al. |
| 2007/0156998 | A1 | 7/2007 | Gorobets |
| 2007/0233937 | A1 | 10/2007 | Coulson et al. |
| 2008/0140914 | A1 | 6/2008 | Jeon |
| 2008/0147994 | A1 | 6/2008 | Jeong et al. |
| 2008/0235466 | A1 | 9/2008 | Traister |
| 2008/0235480 | A1 | 9/2008 | Traister |
| 2008/0295094 | A1 | 11/2008 | Korupolu et al. |
| 2009/0168525 | A1 | 7/2009 | Olbrich et al. |
| 2009/0177943 | A1 | 7/2009 | Silvus et al. |
| 2009/0222627 | A1 | 9/2009 | Reid |
| 2009/0282191 | A1 | 11/2009 | Depta |
| 2010/0005217 | A1 | 1/2010 | Jeddeloh |
| 2010/0014364 | A1 | 1/2010 | Laberge et al. |
| 2010/0082879 | A1 | 4/2010 | McKean et al. |
| 2010/0165730 | A1 | 7/2010 | Sommer et al. |
| 2010/0174845 | A1 | 7/2010 | Gorobets et al. |
| 2010/0174853 | A1 | 7/2010 | Lee et al. |
| 2010/0220509 | A1 | 9/2010 | Solokov et al. |
| 2010/0250874 | A1 | 9/2010 | Farrell et al. |
| 2011/0113204 | A1 | 5/2011 | Henriksson et al. |
| 2011/0138100 | A1 | 6/2011 | Sinclair |
| 2011/0235434 | A1 | 9/2011 | Byom et al. |
| 2011/0252215 | A1 | 10/2011 | Franceschini et al. |
| 2011/0264851 | A1 | 10/2011 | Jeon et al. |
| 2011/0302474 | A1 | 12/2011 | Goss et al. |
| 2012/0030408 | A1 | 2/2012 | Flynn et al. |
| 2012/0047317 | A1 | 2/2012 | Yoon et al. |
| 2012/0159070 | A1 | 6/2012 | Baderdinni et al. |
| 2012/0198129 | A1 | 8/2012 | Van Aken et al. |
| 2012/0224425 | A1 | 9/2012 | Fai et al. |
| 2012/0278530 | A1 | 11/2012 | Ebsen |
| 2012/0324180 | A1 | 12/2012 | Asnaashari et al. |
| 2013/0007380 | A1 | 1/2013 | Seekins et al. |
| 2013/0070507 | A1 | 3/2013 | Yoon |
| 2013/0111112 | A1 | 5/2013 | Jeong et al. |
| 2013/0111289 | A1 | 5/2013 | Zhang et al. |
| 2013/0111290 | A1 | 5/2013 | Zhang et al. |
| 2013/0132650 | A1 | 5/2013 | Choi et al. |
| 2013/0182506 | A1 | 7/2013 | Melik-Martirosian |
| 2013/0219106 | A1* | 8/2013 | Vogan ................. G06F 12/0246 711/103 |
| 2013/0232290 | A1 | 9/2013 | Ish et al. |
| 2013/0254498 | A1 | 9/2013 | Adachi et al. |
| 2013/0262745 | A1 | 10/2013 | Lin et al. |
| 2013/0297894 | A1 | 11/2013 | Cohen et al. |
| 2013/0346805 | A1 | 12/2013 | Sprouse et al. |
| 2014/0006688 | A1 | 1/2014 | Yu et al. |
| 2014/0013026 | A1 | 1/2014 | Jannyavula Venkata et al. |
| 2014/0047170 | A1 | 2/2014 | Cohen et al. |
| 2014/0075100 | A1 | 3/2014 | Kaneko et al. |
| 2014/0143637 | A1 | 5/2014 | Cohen et al. |
| 2014/0173239 | A1 | 6/2014 | Schushan |
| 2014/0229655 | A1 | 8/2014 | Goss et al. |
| 2014/0229656 | A1 | 8/2014 | Goss et al. |
| 2014/0241071 | A1 | 8/2014 | Goss et al. |
| 2014/0244897 | A1 | 8/2014 | Goss et al. |
| 2014/0244899 | A1 | 8/2014 | Schmier et al. |
| 2014/0258598 | A1 | 9/2014 | Canepa et al. |
| 2014/0281833 | A1 | 9/2014 | Kroeger et al. |
| 2014/0310241 | A1 | 10/2014 | Goyen |
| 2014/0379988 | A1 | 12/2014 | Lyakhovitskiy et al. |
| 2015/0067172 | A1 | 3/2015 | Ashokan et al. |
| 2015/0074487 | A1 | 3/2015 | Patapoutian et al. |
| 2015/0095558 | A1 | 4/2015 | Kim et al. |
| 2015/0113206 | A1 | 4/2015 | Fitzpatrick et al. |
| 2015/0186278 | A1 | 7/2015 | Jayakumar et al. |
| 2015/0234612 | A1 | 8/2015 | Himelstein et al. |
| 2015/0261473 | A1 | 9/2015 | Matsuyama et al. |
| 2015/0262632 | A1 | 9/2015 | Shelton et al. |
| 2015/0301749 | A1 | 10/2015 | Seo et al. |
| 2015/0331627 | A1 | 11/2015 | Kwak |
| 2016/0026386 | A1 | 1/2016 | Ellis et al. |
| 2016/0034194 | A1 | 2/2016 | Brokhman et al. |
| 2016/0062699 | A1 | 3/2016 | Samuels et al. |
| 2016/0070493 | A1 | 3/2016 | Oh et al. |
| 2016/0071612 | A1 | 3/2016 | Takizawa et al. |
| 2016/0117099 | A1 | 4/2016 | Prins et al. |
| 2016/0117102 | A1 | 4/2016 | Hong et al. |
| 2016/0117105 | A1 | 4/2016 | Thangaraj et al. |
| 2016/0117252 | A1 | 4/2016 | Thangaraj et al. |
| 2016/0170671 | A1 | 6/2016 | Huang |
| 2016/0170831 | A1 | 6/2016 | Lesatre et al. |
| 2016/0179403 | A1 | 6/2016 | Kurotsuchi et al. |
| 2016/0210060 | A1 | 7/2016 | Dreyer |
| 2016/0299689 | A1 | 10/2016 | Kim et al. |
| 2016/0299699 | A1 | 10/2016 | Vanaraj et al. |
| 2016/0299704 | A1 | 10/2016 | Vanaraj et al. |
| 2016/0299724 | A1 | 10/2016 | Vanaraj et al. |
| 2016/0342344 | A1 | 11/2016 | Kankani et al. |
| 2016/0342345 | A1 | 11/2016 | Kankani et al. |
| 2016/0371394 | A1 | 12/2016 | Shahidi et al. |

OTHER PUBLICATIONS

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/

(56) References Cited

OTHER PUBLICATIONS

US2015/053582, which corresponds to U.S. Appl. No. 14/659,493, 12 pages (Prins).
International Search Report and Written Opinion dated Jul. 4, 2016, received in International Patent Application No. PCT/US2016/028477, which corresponds to U.S. Appl. No. 14/883,540, 11 pages (Hodgdon).
International Search Report and Written Opinion dated Sep. 8, 2016, received in International Patent Application No. PCT/US2016/036716, which corresponds to U.S. Appl. No. 14/925,945, 13 pages (Ellis).
Atmel Data-sheet, "9-to-bit Selectable, ±0.5°C Accurate Digital Temperature Sensor with Nonvolatile Registers and Serial EEPROM" www.atmel.com/images/Atmel-8854-DTS-AT30TSE752A-754A-758A-Datasheet.pdf, Atmel Data-sheet, Mar. 1, 2011,—Atmel-8854-DTS-AT30TSE752A-754A-758A-Datasheet_102014, 57 pages.
Seagate Technology, "SCSI Commands Reference Manual, Rev. C", Product Manual dated Apr. 2010, pp. 211-214.
Tanenbaum, "Structured Computer Organization", 3rd edition 1990, section 1.4, p. 11, 3 pages.

\* cited by examiner

TRACKING INTERMIX OF WRITES AND UN-MAP COMMANDS ACROSS POWER CYCLES

RELATED APPLICATIONS

This application claims priority to U.S. Provisional Application No. 62/069,249, filed Oct. 27, 2014, and U.S. Provisional Application No. 62/069,251, filed Oct. 27, 2014, which are hereby incorporated by reference in their entirety.

TECHNICAL FIELD

The disclosed embodiments relate generally to memory systems, and in particular, to tracking intermix of writes and un-map commands across power cycles in a storage device (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Data hardening, the saving of data and mission critical metadata held in volatile storage, is important for a storage device. When there is a power failure, mission critical data may reside in volatile memory in a number of sub-system components. Coordinating and managing multiple sub-system components to ensure that volatile data is saved successfully is important for safeguarding data integrity of a storage device.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable tracking intermix of writes and un-map commands across power cycles. In one aspect, upon power up of a storage device, a mapping table in volatile memory is rebuilt from a saved snapshot of the mapping table in non-volatile memory of the storage device and from a saved log in the non-volatile memory of the storage device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
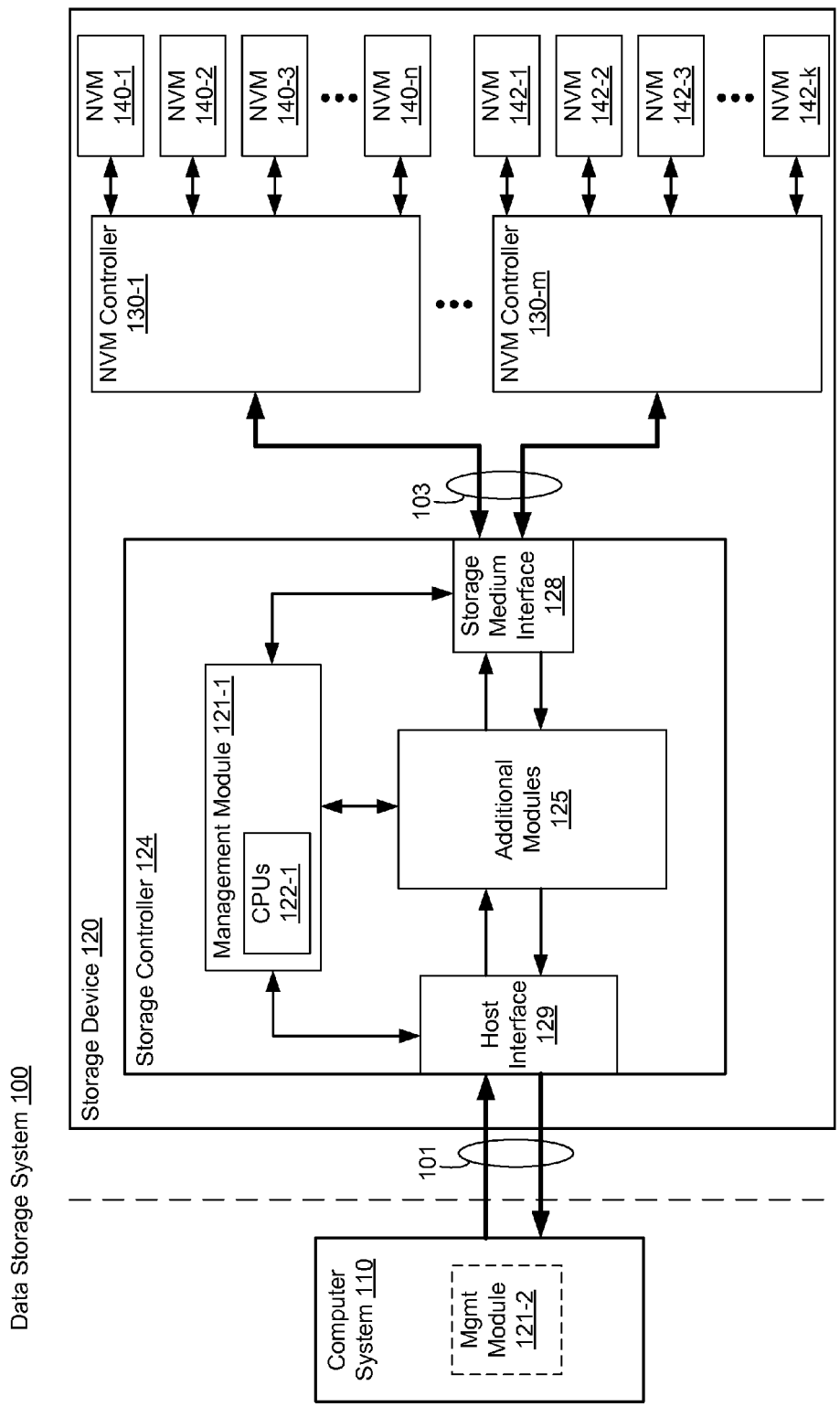
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, and/or devices used to enable tracking intermix of writes and un-map commands across power cycles. Some embodiments include systems, methods and/or devices to rebuild, upon power up of a storage device, a mapping table in volatile memory from a saved snapshot of the mapping table and from a saved log.

(A1) More specifically, some embodiments include a method of managing a storage system. In some embodiments, the method includes (1) receiving, at a storage device of the storage system, a plurality of commands from a host to which the storage device is operatively coupled, the storage device including non-volatile memory, (2) maintaining a log corresponding to write commands and un-map commands from the host, (3) maintaining a mapping table in volatile memory, the mapping table used to translate logical addresses in a logical address space available to the host to physical addresses in a physical address space of the storage device, (4) saving the mapping table, on a scheduled basis that is independent of the un-map commands, to the non-volatile memory of the storage device, (5) saving the log to the non-volatile memory of the storage device, and (6) upon power up of the storage device, rebuilding the mapping table from the saved mapping table in the non-volatile memory of the storage device and from the saved log in the non-volatile memory of the storage device.

(A2) In some embodiments of the method of A1, saving the mapping table includes storing in the non-volatile memory a position pointer to a position in the log.

(A3) In some embodiments of the method of any of A1 to A2, saving the mapping table includes storing a plurality of distinct portions of the mapping table in the non-volatile memory at distinct scheduled times.

(A4) In some embodiments of the method of any of A1 to A3, for write commands, the log includes physical addresses to which data is stored in conjunction with execution of the write commands.

(A5) In some embodiments of the method of any of A1 to A4, the log includes an entry, for a respective un-map command (sometimes called a "first un-map command"), that includes information identifying a plurality of logical addresses un-mapped in accordance with the respective un-map command.

(A6) In some embodiments of the method of any of A1 to A4, the log includes an entry, for a respective un-map command, that includes information identifying a range of logical addresses un-mapped in accordance with the respective un-map command.

(A7) In some embodiments of the method of any of A1 to A6, saving the log to the non-volatile memory includes saving at least a portion of the log to the non-volatile memory in conjunction with a power fail event.

(A8) In some embodiments of the method of any of A1 to A7, saving the log to the non-volatile memory includes saving at least a first portion of the log to the non-volatile memory when the log satisfies predefined fullness criteria, and saving a final portion of the log to the non-volatile memory in conjunction with a power fail event.

(A9) In some embodiments of the method of any of A1 to A8, the storage device comprises one or more flash memory devices.

(A10) In another aspect, a storage device includes (1) non-volatile memory (e.g., comprising one or more non-volatile storage devices, such as flash memory devices), (2) one or more processors, and (3) controller memory (e.g., non-volatile memory or volatile memory in or coupled to the controller) storing one or more programs, which when executed by the one or more processors cause the storage device to perform or control performance of any of the methods A1 to A9 described herein.

(A12) In yet another aspect, any of the methods A1 to A9 described above are performed by a storage device including means for performing any of the methods described herein.

(A14) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods A1 to A9 described herein.

(A15) In yet another aspect, some embodiments include a non-transitory computer readable storage medium, storing one or more programs configured for execution by one or more processors of a storage device, the one or more programs including instructions for performing any of the methods described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes storage device 120 (also sometimes called an information storage device, or a data storage device, or a memory device), which includes storage controller 124, one or more non-volatile memory (NVM) controllers 130 such as flash controllers, and non-volatile memory (e.g., one or more NVM device(s) 140, 142 such as one or more flash memory devices), and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, NVM controllers 130 are solid-state drive (SSD) controllers. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera, and/or any number of supplemental devices to add functionality. In some embodiments, computer system 110 does not have a display and other user interface components.

The one or more NVM controllers 130 are coupled with storage controller 124 through connections 103. Connections 103 are sometimes called data connections, but typically convey commands in addition to data, and optionally convey metadata, error correction information and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device) as components thereof. Furthermore, in some embodiments, storage controller 124, the one or more NVM controllers 130, and NVM devices 140, 142 are embedded in a host device (e.g., computer system 110), such as a mobile device, tablet, other computer or computer controlled device, and the methods described herein are performed, at least in part, by the embedded storage controller.

In some embodiments, storage device 120 includes NVM devices 140, 142 such as flash memory devices (e.g., NVM devices 140-1 through 140-n, and NVM devices 142-1 through 142-k) and NVM controllers 130 (e.g., NVM controllers 130-1 through 130-m). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, each NVM controller of NVM controllers 130 include one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. NVM devices 140, 142 may include any number (i.e., one or more) of memory devices including, without limitation, non-volatile semiconductor memory devices, such as flash memory device(s).

For example, flash memory device(s) (e.g., NVM devices 140, 142) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140, 142) can also be configured for relatively smaller-scale applications such as personal flash drives or hard-disk replacements for personal, laptop, and tablet computers. Although flash memory devices and flash controllers are used as an example here, in some embodiments storage device 120 includes other non-volatile memory device(s) and corresponding non-volatile storage controller(s).

In some embodiments, NVM devices 140, 142 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to NVM controllers 130 though connections 103. In some embodiments, storage medium interface 128 includes read and write circuitry, including circuitry capable of providing reading signals to NVM controllers 130 (e.g., reading threshold voltages for NAND-type flash memory). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs or processors or microprocessors or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more processing units (CPUs, also sometimes called processors or microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code (ECC) to produce a codeword, which is subsequently stored in NVM devices 140, 142. When encoded data (e.g., one or more codewords) is read from NVM devices 140, 142, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in NVM devices 140, 142 from computer system 110. The data received by host interface 129 is made available to an encoder (e.g., in additional module(s) 125), which encodes the data to produce one or more codewords. The one or more codewords are made available to storage medium interface 128, which transfers the one or more codewords to NVM devices 140, 142 (e.g., through NVM controllers 130) in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from NVM devices 140, 142. Storage controller 124 sends one or more read access commands to NVM devices 140, 142 (e.g., through NVM controllers 130), via storage medium interface 128, to obtain raw read data in accordance with memory locations (addresses) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
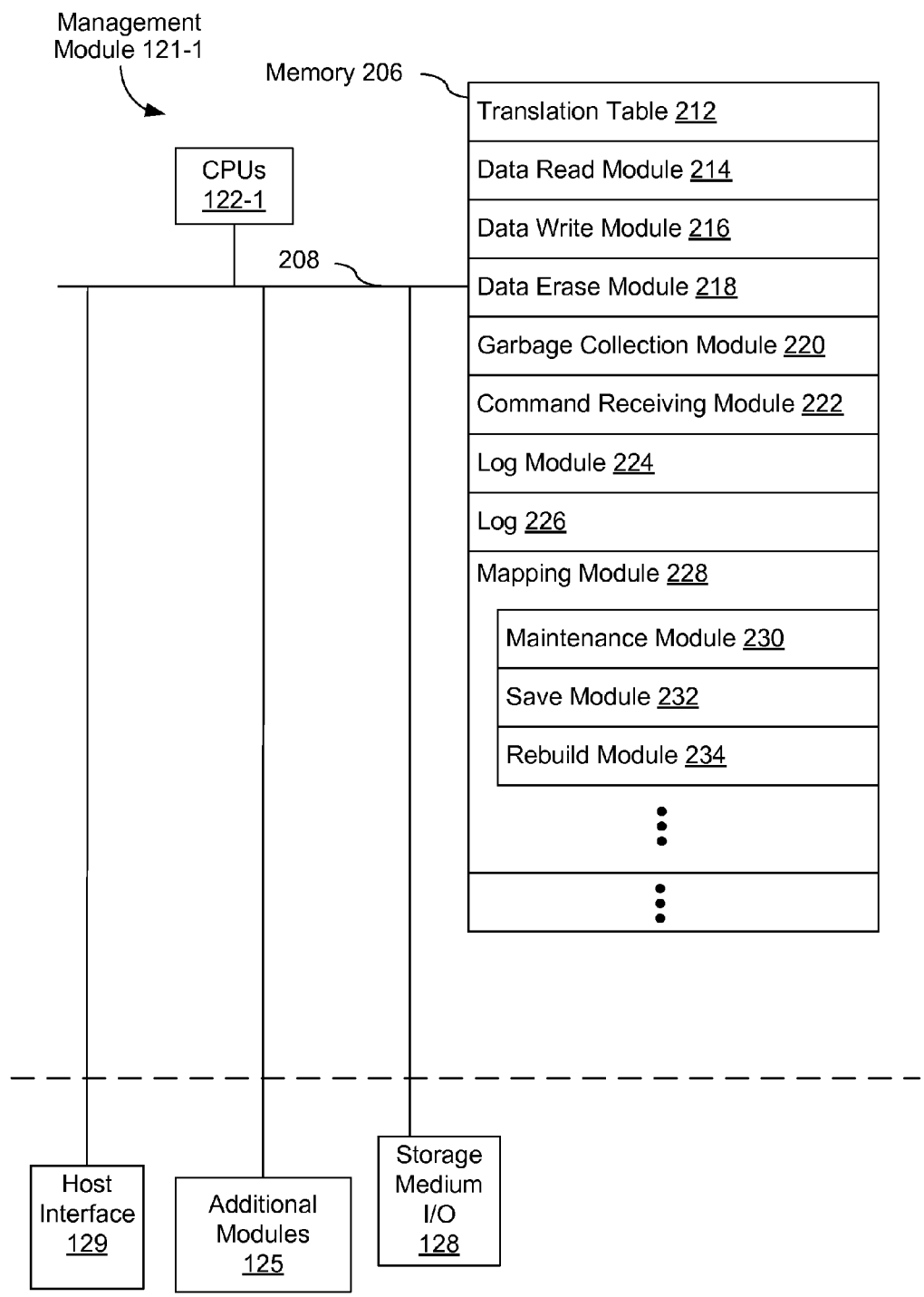
FIG. 2 is a block diagram illustrating an implementation of a management module, in accordance with some embodiments.
Figure 4:
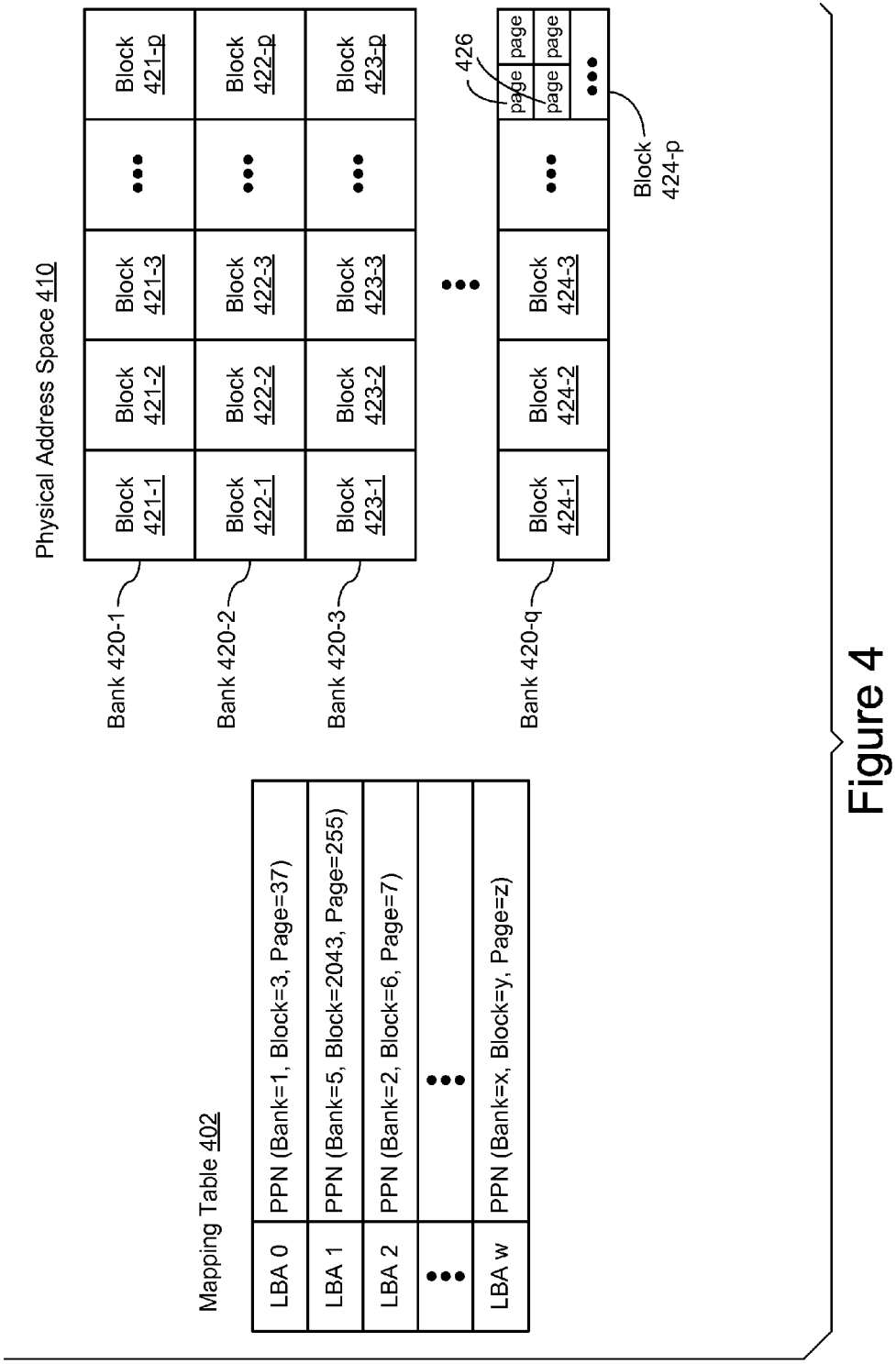
FIG. 4 is a block diagram of a mapping table and physical address space, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122-1 for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- translation table 212 that is used for mapping logical addresses to physical addresses (e.g., in some embodiments, translation table 212 includes mapping table 402, FIG. 4);
- data read module 214 that is used for reading data from one or more codewords, pages or blocks in a storage medium (e.g., NVM devices 140, 142, FIG. 1);
- data write module 216 that is used for writing data to one or more codewords, pages or blocks in a storage medium (e.g., NVM devices 140, 142, FIG. 1);
- data erase module 218 that is used for erasing data from one or more blocks in a storage medium (e.g., NVM devices 140, 142, FIG. 1);
- garbage collection module 220 that is used for garbage collection for one or more blocks in a storage medium (e.g., NVM devices 140, 142, FIG. 1);
- command receiving module 222 that is used for receiving a plurality of commands (e.g., un-map commands and I/O commands such as write requests and/or read requests) from a host;
- log module 224 that is used for maintaining and/or saving a log (e.g., log 226, sometimes called a Replay FIFO);
- log 226 that includes a collection of data structures corresponding to write commands and un-map commands from a host; and
- mapping module 228 that is used for performing one or more operations related to a mapping table (e.g., translation table 212), optionally including:
  - maintenance module 230 that is used for maintaining the mapping table in volatile memory;
  - save module 232 that is used for saving the mapping table to non-volatile memory of the storage device; and
  - rebuild module 234 that is used for rebuilding the mapping table.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 3:
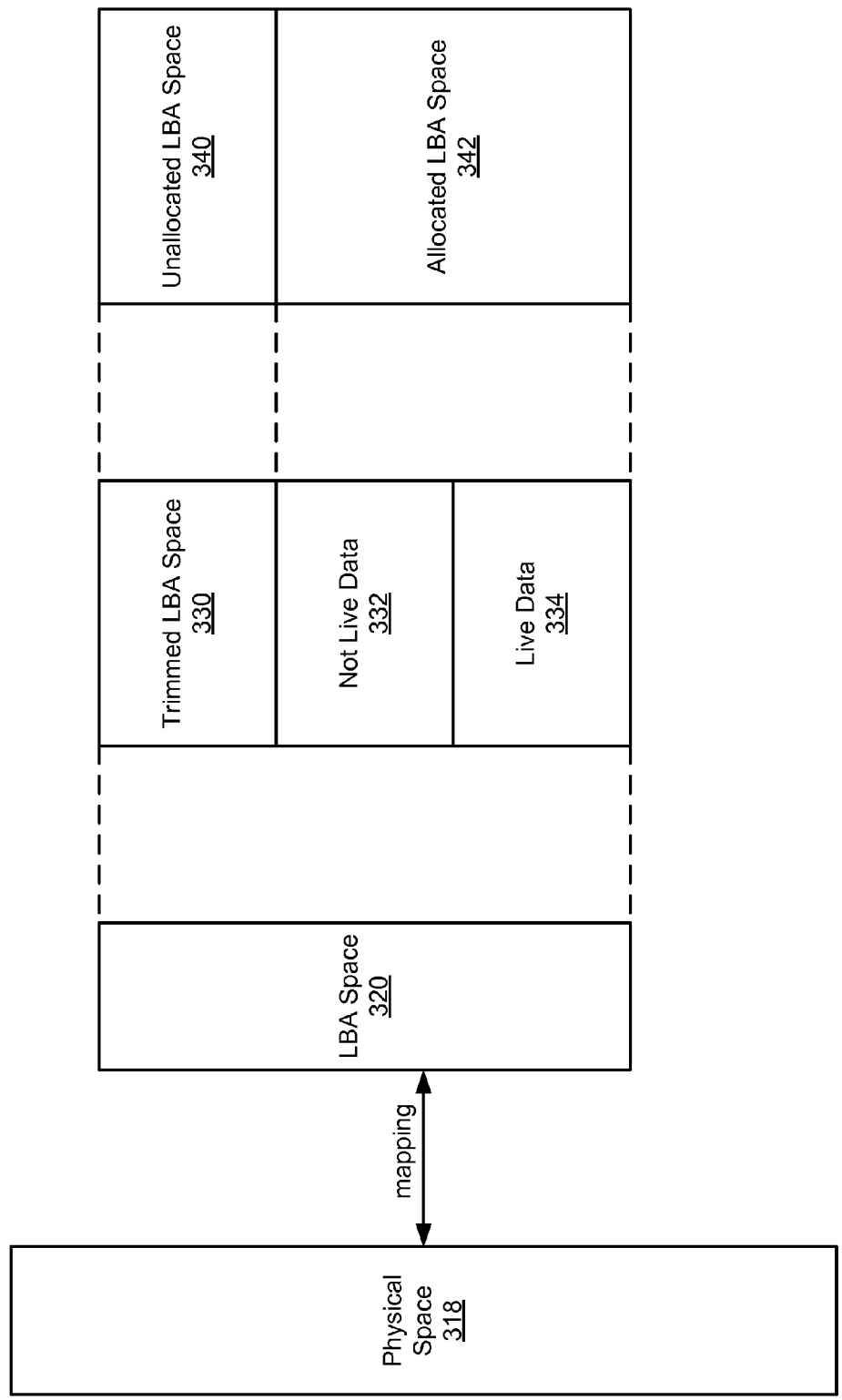
FIG. 3 is a block diagram of a logical address space, and more specifically a logical block address (LBA) space, in accordance with some embodiments.

FIG. 3 is a block diagram of a logical block address (LBA) space 320 (sometimes called logical address (LA) space), in accordance with some embodiments. In some embodiments, a logical address is the address at which an item (e.g., a file or other data) resides from the perspective of a host (e.g., computer system 110, FIG. 1). In some embodiments, a logical address (e.g., in LBA space 320) differs from a physical address (e.g., in physical space 318) due to the operation of a mapping function or address translator (e.g., a function or module that includes translation table 212, FIG. 2, or mapping table 402, FIG. 4). In some embodiments, logical addresses are implemented as logical block addresses (LBAs), which are mapped to physical flash addresses (e.g., physical page numbers (PPNs)). Physical addresses typically include portions, such as bank, block and page, corresponding to multiple levels of a memory hierarchy.

In some embodiments, a logical block address (LBA) is mapped to a physical flash address (e.g., a physical page number (PPN), including a bank, block, and page), as described further with respect to FIG. 4.

In some embodiments, a logical address space includes allocated logical address space (e.g., allocated LBA space 342) and unallocated logical address space (e.g., unallocated LBA space 340). In some embodiments, unallocated logical address space is logical address space at which no data is stored. In some embodiments, unallocated logical address space includes logical address space that has never been written to and/or has been discarded (previously written data may be discarded through a trim or un-map operation, and is sometimes called trimmed logical address space). For example, in FIG. 3, unallocated LBA space 340 includes trimmed LBA space 330. In some embodiments, allocated logical address space is logical address space that was previously-written by a host, the previously-written data including data that is no longer used by a host (e.g., not live data 332) and data that is still in use by the host (e.g., live data 334). In some embodiments, not live data is data in a portion of the logical address space that is marked as free, available or unused in the metadata of a file system. Optionally, a file system may choose to convert not live address space into unallocated address space through a trim or un-map operation.

In FIG. 3, allocated LBA space 342 represents an amount of allocated space, and unallocated LBA space 340 represents an amount of unallocated space. However, neither allocated LBA space 342 nor unallocated LBA space 340 is necessarily a single contiguous region of LBA space 320. Similarly, live data 334 and not live data 332 in FIG. 3 represent amounts (e.g., counts of LBAs) of live data and not live data, respectively. However, neither live data 334 nor not live data 332 is necessarily a single contiguous region of LBA space 320 or allocated LBA space 342, nor do the positions of live data 334 and not live data 332 illustrated in FIG. 3 have any correlation to the logical or physical address values of the live data and not live data. Typically, live data 334 and/or not live data 332 will be present in multiple regions of LBA space 320, and are thus non-contiguous. Optionally, however, a remapping or coalescing process, which can also be called defragmentation, can be performed to consolidate some or all live data 334 into a contiguous region of LBA space 320.

Allocated logical address space (342) is space that is utilized. Typically, reducing the size of the allocated logical address space requires reducing the amount of live data 334 and/or not live data 332 stored by a storage device, or storage system, thereby converting a portion of the allocated logical address space into unallocated logical address space. In some embodiments, portions of not live data 332 are trimmed, and thereby converted into unallocated logical address space through the use of trim or un-map operations.

FIG. 4 is a block diagram of a mapping table 402 and physical address space 410, in accordance with some embodiments. In some embodiments, mapping table 402 is used to translate a logical block address (LBA) from the perspective of a host (e.g., computer system 110, FIG. 1) to a physical address in a physical address space (e.g., physical address space 410) of non-volatile memory in a storage device (e.g., storage device 120, FIG. 1). In some embodiments, an LBA is the address of the smallest unit of stored data that is addressable by a host (e.g., 512 B or 4096 B). In some embodiments, LBAs are a sequence of integers organized in numerical order in the logical address space. In some embodiments, LBAs are integers chosen from a logical address space but need not be contiguous. For example, in implementations that utilize a sparse logical address space, the amount of addressable space is governed by a limit on the number of logical addresses that can be allocated, but those logical addresses are distributed over a larger address space than the maximum number of logical addresses that can be allocated (e.g., to a host or a set of hosts or clients).

In some embodiments, mapping table 402 is stored in memory associated with the storage device (e.g., in memory 206, as part of translation table 212, FIG. 2). In some embodiments, mapping table 402 is used to implement translation table 212 in management module 121-1 (FIG. 2). In some embodiments, a physical address is a physical page number (PPN), including a bank number, a block number, and a page number. In the example shown in FIG. 4, LBA 0 is mapped to bank 1 (e.g., Bank 420-1), block 3 (e.g., Block 421-3), page 37 (pages not shown in Block 421-3) of physical address space 410. FIG. 4 shows that physical address space 410 includes a plurality of non-volatile memory blocks 421, 422 423, 424. As described above, and as shown in the representation of block 424-p, each non-volatile memory block in the physical address space of a storage device typically includes a plurality of pages 426, where each page is typically an instance of the smallest individually accessible (e.g., readable or writable) portion of a block. Although FIG. 4 illustrates one example of a logical address to physical address mapping, in other embodiments, different mappings may be used. For example, in some embodiments, each of the logical address entries corresponds to multiple (e.g., eight) logical addresses (e.g., 8 LBAs per logical address entry). In some embodiments, mapping table 402 need not contain contiguous LBA addresses and may be organized in any manner that facilitates efficient lookup operations, e.g., hash table, binary tree, content addressable memory, and others.

As noted above, the saving of data and mission critical metadata held in volatile storage, is important for a non-volatile data storage device. Flash memory devices need to have data protected across power cycles, and a full translation table (e.g., translation table 212, FIG. 2, or mapping table 402, FIG. 4) is required for a storage device (e.g., storage device 120, FIG. 1) to be valid. However, for enterprise products, the translation table is typically extremely large (e.g., several 100 MB) and saving the full translation table is not viable in the time frame provided by battery backups (e.g., capacitors). In some embodiments, incremental portions of the translation table are saved at scheduled times, in order to minimize the amount of data that needs to be saved in the event of a power failure. However, un-map commands, which effectively erase a portion of data (e.g., one sector, one unit, the whole storage device, etc.), is expected to respond near instantly. This response time does not allow for the saving of the full translation table. The various embodiments described herein include systems, methods and/or devices used to enable replying quickly to an un-map command and ensuring coherency of the translation table by tracking intermix of writes and un-map commands across power cycles via a log (sometimes called a Replay FIFO).

Figure 5A:
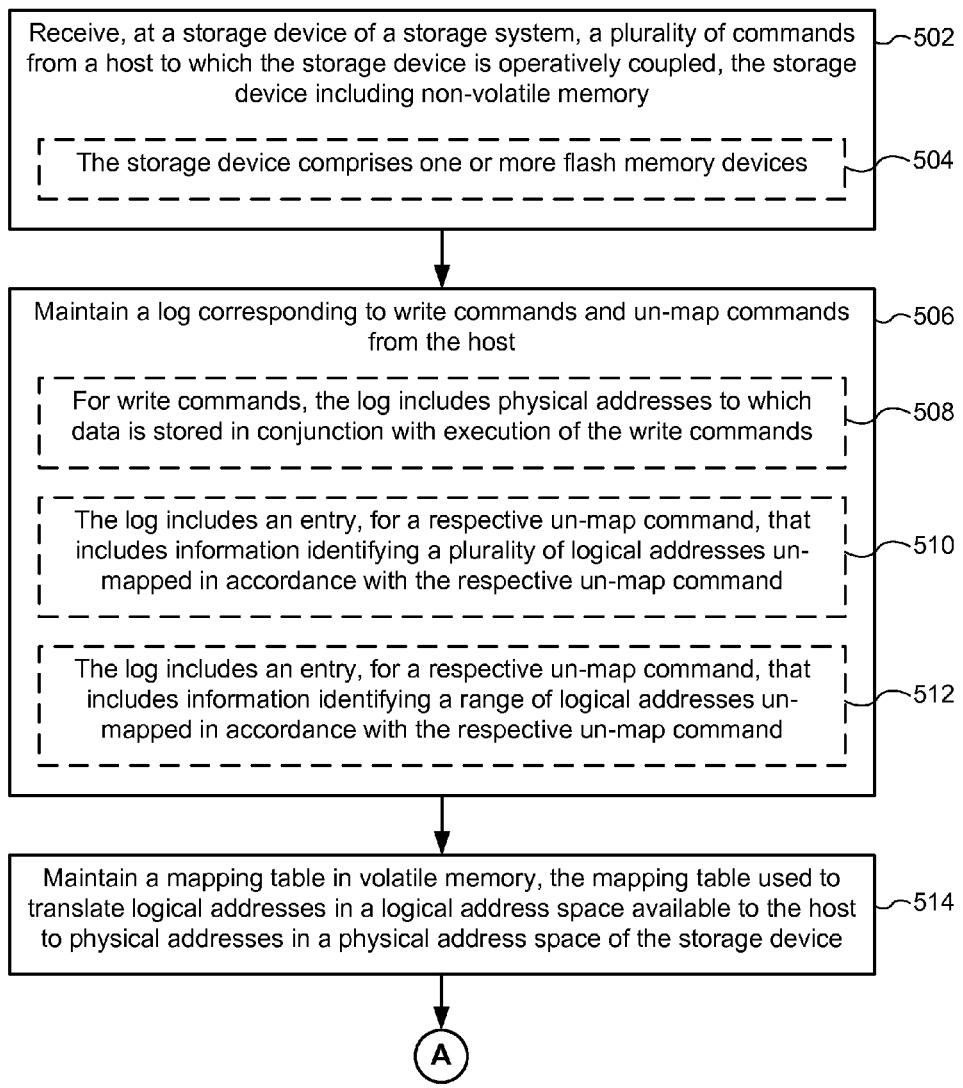
FIGS. 5A-5B illustrate a flowchart representation of a method of managing a storage system, in accordance with some embodiments.
Figure 5B:
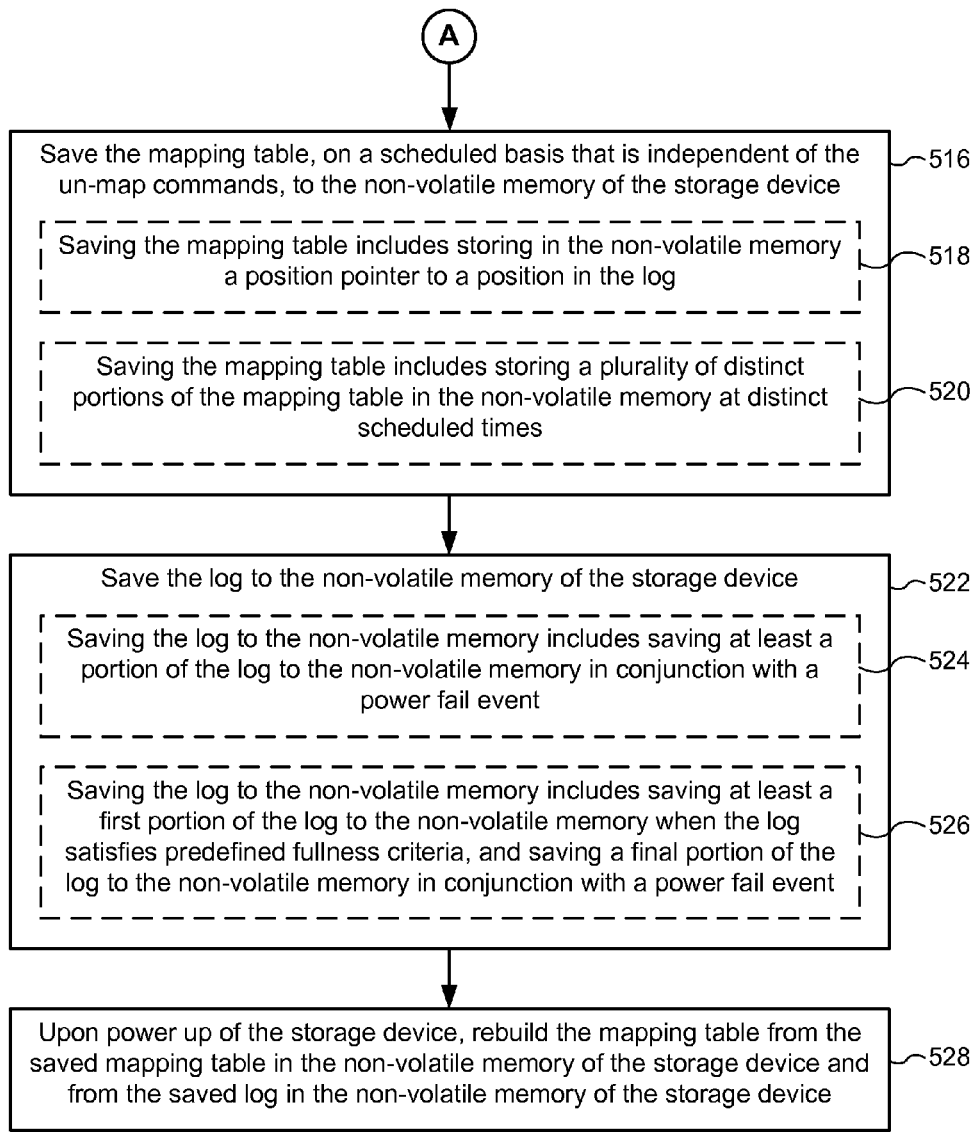

FIGS. 5A-5B illustrate a flowchart representation of a method 500 of managing a storage system, in accordance with some embodiments. At least in some embodiments, method 500 is performed by a storage device (e.g., storage device 120, FIG. 1) or one or more components of the storage device (e.g., storage controller 124, NVM controllers 130 and/or NVM devices 140, 142, FIG. 1), wherein the storage device is operatively coupled with a host system (e.g., computer system 110, FIG. 1). In some embodiments, method 500 is governed by instructions that are stored in a non-transitory computer readable storage medium and that are executed by one or more processors of a device, such as the one or more processing units (CPUs) 122-1 of management module 121-1, shown in FIGS. 1 and 2. In some embodiments, method 500 is performed by a storage system (e.g., data storage system 100, FIG. 1) or one or more components of the storage system (e.g., computer system 110 and/or storage device 120, FIG. 1). In some embodiments, some of the operations of method 500 are performed at a host (e.g., computer system 110, FIG. 1) and information is transmitted to a storage device (e.g., storage device 120, FIG. 1). In some embodiments, method 500 is governed, at least in part, by instructions that are stored in a non-transitory computer readable storage medium and that are executed by one or more processors of a host (not shown in FIG. 1). For ease of explanation, the following describes method 500 as performed by a storage device (e.g., storage device 120, FIG. 1). However, those skilled in the art will appreciate that in other embodiments, one or more of the operations described in method 500 are performed by a host (e.g., computer system 110, FIG. 1).

A storage device (e.g., storage device 120, FIG. 1) of a storage system (e.g., data storage system 100, FIG. 1) receives (502) a plurality of commands from a host (e.g., computer system 110, FIG. 1) to which the storage device is operatively coupled, the storage device including non-volatile memory (e.g., NVM devices 140, 142, FIG. 1). In some embodiments, the plurality of commands includes write commands, read commands, and/or un-map commands. In some embodiments, a command receiving module (e.g., command receiving module 222, FIG. 2) is used to receive, at a storage device of a storage system, a plurality of commands from a host to which the storage device is operatively coupled, the storage device including non-volatile memory, as described above with respect to FIG. 2.

In some embodiments, the storage device includes (504) one or more flash memory devices. In some embodiments, the storage device includes a storage medium (e.g., NVM devices 140, 142, FIG. 1), and the storage medium includes one or more non-volatile storage devices, such as flash memory devices. In some embodiments, the storage medium is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., NVM devices 140, 142, FIG. 1) includes NAND-type flash memory or NOR-type flash memory. In other embodiments, the storage medium comprises one or more other types of non-volatile storage devices.

The storage device maintains (506) a log (e.g., log 226, FIG. 2, sometimes called a Replay FIFO) corresponding to write commands and un-map commands from the host. In some embodiments, the log is a FIFO (First In First Out) queue. In some embodiments, the storage device maintains a single log for the storage device. In some embodiments, the storage device maintains a distinct log for each logical port (sometimes called a memory channel) of the storage device. In some embodiments, a log module (e.g., log module 224, FIG. 2) is used to maintain a log corresponding to write commands and un-map commands from the host, as described above with respect to FIG. 2.

In some embodiments, for write commands, the log includes (508) physical addresses to which data is stored in conjunction with execution of the write commands. For example, in some embodiments, each physical page entry in the log includes a die number, block number, and page number of the page as it is physically written. In some embodiments, the physical page entries are logged into the log in the interleaved order they are written in the storage medium (e.g., NVM devices 140, 142).

In some embodiments, the log includes (510) an entry, for a respective un-map command, that includes information identifying a plurality of logical addresses un-mapped in accordance with the respective un-map command. For example, in some embodiments, if a respective un-map command is un-mapping LBA 8, LBA 13, and LBA 63, the entry in the log for the respective un-map command includes information identifying LBA 8, LBA 13, and LBA 63. In some alternative embodiments, when the logical addresses unmapped by un-map command are not a single address and are not a single range of logical addresses, the log includes multiple entries corresponding to the un-map command, each entry specifying either an individual LBA or a range of LBA's that is unmapped by the un-map command. For example, for an un-map command that un-maps LBA 8 and LBAs 100-130, the log contains two entries, one for LBA 8 and the other for LBA range 100-130.

In some embodiments, the log includes (512) an entry, for a respective un-map command, that includes information identifying a range of logical addresses un-mapped in accordance with the respective un-map command. For example, in some embodiments, if a respective un-map command is un-mapping LBA 8 to LBA 63, the entry in the log for the respective un-map command includes information identifying a range of logical addresses from LBA 8 to LBA 63. In some embodiments, the entry in the log identifies the range of logical addresses by identifying the first LBA to un-map and the last LBA to un-map.

The storage device maintains (514) a mapping table (e.g., translation table 212, FIG. 2, and/or mapping table 402, FIG. 4) in volatile memory, the mapping table used to translate logical addresses in a logical address space available to the host to physical addresses in a physical address space of the storage device. In some embodiments, a maintenance module (e.g., maintenance module 230, FIG. 2) is used to maintain a mapping table in volatile memory, the mapping table used to translate logical addresses in a logical address space available to the host to physical addresses in a physical address space of the storage device, as described above with respect to FIG. 2.

The storage device saves (516) the mapping table, on a scheduled basis that is independent of the un-map commands (e.g., independent of receiving and/or processing the un-map commands), to the non-volatile memory (e.g., NVM devices 140, 142, FIG. 1) of the storage device. For example, in some embodiments, the storage device saves the mapping table (e.g., a portion of the mapping table) on a periodic basis (e.g., every hour, etc.). In some embodiments, the storage device saves the mapping table on a scheduled basis that is not periodic (e.g., at 1:00 am, at 3:30 am, and at 6:00 am). In some embodiments, a save module (e.g., save module 232, FIG. 2) is used to save the mapping table, on a scheduled basis that is independent of the un-map commands, to the non-volatile memory of the storage device, as described above with respect to FIG. 2.

In some embodiments, saving the mapping table includes (518) storing in the non-volatile memory a position pointer to a position in the log. In some embodiments, a position in the log corresponds to an entry in the log to be processed when rebuilding the mapping table (as described below with respect to operation 528). In some embodiments, a position in the log is offset from a last entry in the log that corresponds to a portion of the mapping table updated prior to saving the mapping table to the non-volatile memory of the storage device. For example, if entry n was the last entry in the log that is reflected in the saved mapping table in non-volatile memory, the position in the log would point to entry n+1, as the next entry to be processed when rebuilding the mapping table.

In some embodiments, saving the mapping table includes (520) storing a plurality of distinct portions of the mapping table in the non-volatile memory at distinct scheduled times. In some embodiments, the storage device stores a portion (e.g., 10 MB) of the mapping table on a periodic basis (e.g., every hour, etc.). In some embodiments, the storage device stores a portion of the mapping table on a scheduled basis that is not periodic (e.g., at 1:00 am, at 3:30 am, and at 6:00 am). In some embodiments, the storage device saves a first portion of the mapping table at a first time, saves a second portion of the mapping table at a second time distinct from (and typically later than) the first time, saves a third portion of the mapping table at a third time distinct from (and typically later than) the first time and second time, etc.

The storage device saves (522) the log (e.g., log 226, FIG. 2) to the non-volatile memory (e.g., NVM devices 140, 142, FIG. 1) of the storage device. In some embodiments, a log module (e.g., log module 224, FIG. 2) saves the log to the non-volatile memory of the storage device, as described above with respect to FIG. 2.

In some embodiments, saving the log to the non-volatile memory includes (524) saving at least a portion of the log to the non-volatile memory (e.g., NVM devices 140, 142, FIG. 1) in conjunction with a power fail event. For example, in some embodiments, a portion of the log corresponding to entries not yet reflected in the saved mapping table is saved to the non-volatile memory.

In some embodiments, saving the log to the non-volatile memory includes (526) saving at least a first portion of the log to the non-volatile memory (e.g., NVM devices 140, 142, FIG. 1) when the log satisfies predefined fullness criteria, and saving a final portion of the log to the non-volatile memory in conjunction with a power fail event. For example, in some embodiments, when the log is half full, a first half of the log is saved to the non-volatile memory, and in conjunction with a power fail event, a final portion (e.g., a remainder of the log not yet saved) of the log is saved to the non-volatile memory.

The storage device, upon power up of the storage device, rebuilds (528) the mapping table from the saved mapping table in the non-volatile memory of the storage device and from the saved log in the non-volatile memory of the storage device. In some embodiments, the storage device rebuilds the mapping table by updating the saved mapping table with entries from the saved log, starting at a saved position in the log (as described above with respect to operation 518) and updating the mapping table until the end of the log is reached. In some embodiments, rebuilding the mapping table includes obtaining block metadata (e.g., to obtain corresponding logical addresses for the physical addresses in the log). In some embodiments, a rebuild module (e.g., rebuild module 234, FIG. 2) is used to rebuild, upon power up of the storage device, the mapping table from the saved mapping table in the non-volatile memory of the storage device and from the saved log in the non-volatile memory of the storage device, as described above with respect to FIG. 2.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system, the method comprising:
   receiving, at a storage device of the storage system, a plurality of commands from a host to which the storage device is operatively coupled, the plurality of commands from the host including write commands and un-map commands, the storage device including non-volatile memory;
   maintaining a log corresponding to the write commands and un-map commands from the host;
   maintaining a mapping table in volatile memory, the mapping table used to translate logical addresses in a logical address space available to the host to physical addresses in a physical address space of the storage device, wherein the log is distinct from the mapping table;

saving the mapping table, on a scheduled basis that is independent of the plurality of commands from the host, to the non-volatile memory of the storage device;

saving the log to the non-volatile memory of the storage device; and upon power up of the storage device, rebuilding the mapping table from the saved mapping table in the non-volatile memory of the storage device and from the saved log in the non-volatile memory of the storage device.

2. The method of claim 1, wherein saving the mapping table includes storing in the non-volatile memory a position pointer to a position in the log.

3. The method of claim 1, wherein:

saving the mapping table includes storing a plurality of distinct portions of the mapping table in the non-volatile memory at distinct scheduled times that are independent of the plurality of commands from the host; and the rebuilding comprises rebuilding the mapping table from the plurality of distinct portions of the mapping table stored in the non-volatile memory and the saved log in the non-volatile memory.

4. The method of claim 1, wherein for write commands, the log includes physical addresses to which data is stored in conjunction with execution of the write commands.

5. The method of claim 1, wherein the log includes an entry for a first un-map command, the entry including information identifying a plurality of logical addresses un-mapped in accordance with the first un-map command.

6. The method of claim 1, wherein the log includes an entry for a first un-map command, the entry including information identifying a range of logical addresses un-mapped in accordance with the first un-map command.

7. The method of claim 1, wherein saving the log to the non-volatile memory includes saving at least a portion of the log to the non-volatile memory in conjunction with a power fail event.

8. The method of claim 1, wherein saving the log to the non-volatile memory includes:

saving at least a first portion of the log to the non-volatile memory responsive to the log satisfying predefined fullness criteria; and saving a final portion of the log to the non-volatile memory in conjunction with a power fail event.

9. The method of claim 1, wherein the storage device comprises one or more flash memory devices.

10. A storage device, comprising:
non-volatile memory;
one or more processors; and
controller memory storing one or more programs configured for execution by the one or more processors, the one or more programs including instructions for:
receiving, at the storage device, a plurality of commands from a host to which the storage device is operatively coupled, the plurality of commands from the host including write commands and un-map commands;
maintaining a log corresponding to write commands and un-map commands from the host;
maintaining a mapping table in volatile memory, the mapping table used to translate logical addresses in a logical address space available to the host to physical addresses in a physical address space of the storage device, wherein the log is distinct from the mapping table;

saving the mapping table, on a scheduled basis that is independent of the plurality of commands from the host, to the non-volatile memory;

saving the log to the non-volatile memory; and upon power up of the storage device, rebuilding the mapping table from the saved mapping table in the non-volatile memory and from the saved log in the non-volatile memory.

11. The storage device of claim 10, wherein saving the mapping table includes storing in the non-volatile memory a position pointer to a position in the log.

12. The storage device of claim 10, wherein:

saving the mapping table includes storing a plurality of distinct portions of the mapping table in the non-volatile memory at distinct scheduled times that are independent of the plurality of commands from the host; and the rebuilding comprises rebuilding the mapping table from the plurality of distinct portions of the mapping table stored in the non-volatile memory and the saved log in the non-volatile memory.

13. The storage device of claim 10, wherein for write commands, the log includes physical addresses to which data is stored in conjunction with execution of the write commands.

14. The storage device of claim 10, wherein the log includes an entry for a first un-map command, the entry including information identifying a plurality of logical addresses un-mapped in accordance with the first un-map command.

15. The storage device of claim 10, wherein saving the log to the non-volatile memory includes saving at least a portion of the log to the non-volatile memory in conjunction with a power fail event.

16. The storage device of claim 10, wherein saving the log to the non-volatile memory includes:

saving at least a first portion of the log to the non-volatile memory responsive to the log satisfying predefined fullness criteria; and saving a final portion of the log to the non-volatile memory in conjunction with a power fail event.

17. A non-transitory computer-readable storage medium, storing one or more programs configured for execution by one or more processors of a storage device, the one or more programs including instructions for:

receiving, at the storage device, a plurality of commands from a host to which the storage device is operatively coupled, the plurality of commands from the host including write commands and un-map commands, the storage device including non-volatile memory;

maintaining a log corresponding to write commands and un-map commands from the host;

maintaining a mapping table in volatile memory, the mapping table used to translate logical addresses in a logical address space available to the host to physical addresses in a physical address space of the storage device, wherein the log is distinct from the mapping table;

saving the mapping table, on a scheduled basis that is independent of the plurality of commands from the host, to the non-volatile memory;

saving the log to the non-volatile memory; and upon power up of the storage device, rebuilding the mapping table from the saved mapping table in the non-volatile memory and from the saved log in the non-volatile memory.

18. The storage medium of claim 17, wherein saving the mapping table includes storing in the non-volatile memory a position pointer to a position in the log.

19. The storage medium of claim 17, wherein:
saving the mapping table includes storing a plurality of distinct portions of the mapping table in the non-volatile memory at distinct scheduled times that are independent of the plurality of commands from the host; and
the rebuilding comprises rebuilding the mapping table from the plurality of distinct portions of the mapping table stored in the non-volatile memory and the saved log in the non-volatile memory.

20. The storage medium of claim 17, wherein for write commands, the log includes physical addresses to which data is stored in conjunction with execution of the write commands.

21. The storage medium of claim 17, wherein the log includes an entry for a first un-map command, the entry including information identifying a plurality of logical addresses un-mapped in accordance with the first un-map command.

22. The storage medium of claim 17, wherein saving the log to the non-volatile memory includes saving at least a portion of the log to the non-volatile memory in conjunction with a power fail event.

23. The storage medium of claim 17, wherein saving the log to the non-volatile memory includes:
saving at least a first portion of the log to the non-volatile memory responsive to the log satisfying predefined fullness criteria; and
saving a final portion of the log to the non-volatile memory in conjunction with a power fail event.

\* \* \* \* \*